US005581035A

United States Patent [19]
Greiff

[11] Patent Number: 5,581,035
[45] Date of Patent: Dec. 3, 1996

[54] MICROMECHANICAL SENSOR WITH A GUARD BAND ELECTRODE

[75] Inventor: Paul Greiff, Wayland, Mass.

[73] Assignee: The Charles Stark Draper Laboratory, Inc., Cambridge, Mass.

[21] Appl. No.: 297,655

[22] Filed: Aug. 29, 1994

[51] Int. Cl.$^6$ ............................................. G01P 15/125
[52] U.S. Cl. ........................... 73/514.32; 73/514.18; 324/688; 361/280
[58] Field of Search ....................... 73/514.17, 514.18, 73/514.23, 514.32; 310/309; 324/687, 688; 361/280, 283.1, 283.2, 283.3, 283.4, 290, 291; 437/228 SEN, 901, 921, 927, 148, DIG. 159

[56] References Cited

U.S. PATENT DOCUMENTS

| Re. 32,931 | 5/1989 | Staudte | 73/505 |
| Re. 33,479 | 12/1990 | Juptner et al. | 73/505 |
| 3,053,095 | 9/1962 | Koril et al. | 73/504 |

(List continued on next page.)

FOREIGN PATENT DOCUMENTS

| 2183040 | 5/1987 | Germany | G01F 15/02 |
| 58-136125 | 8/1983 | Japan | H03H 9/17 |
| 59-037722 | 3/1984 | Japan | H03H 9/17 |
| 61-144576 | 7/1986 | Japan | G01P 15/09 |
| 62-221164 | 9/1987 | Japan | H01L 29/84 |
| 63-169078 | 7/1988 | Japan | H01L 29/84 |
| 92/01941 | 2/1992 | WIPO | G01P 9/04 |
| 93/05401 | 3/1993 | WIPO | G01P 9/04 |

OTHER PUBLICATIONS

Boxenhorn, B., et al., "Micromechnaical Inertial Guidance System and its Application," *Fourteenth Biennial Guidance Test Symposium*, vol. 1, Oct. 3–5, 1989, pp. 113–131.

Barth, P. W. et al., "A Monolithic Silicon Accelerometer With Integral Air Damping and Overrange Protection," 1988 IEEE, pp. 35–38.

Boxenhorn, B., et al., "An Electrostatically Rebalanced Micromechanical Accelerometer," AIAA Guidance, Navigation and Control Conference, Boston, Aug. 14–16, 1989, pp. 118–122.

Boxenhorn, B., et al., "Monolithic Silicon Accelerometer," *Transducers '89*, Jun. 25–30, 1989, pp. 273–277.

Boxenhorn, B., et al., "A Vibratory Micromechanical Gyroscope," AIAA Guidance, Navigation and Control Conference, Minneapolis, Aug. 15–17, 1988, pp. 1033–1040.

Howe, R., et al., "Silicon Micromechanics: Sensors and Acturators On a Chip," IEEE Spectrum, Jul. 1990, pp. 29–35.

Moskalik, L., "Tensometric Accelerometers with Overload Protection," Meas. Tech (USA), vol. 22, No. 12, Dec. 1979 (publ. May 1980), pp. 1469–1471.

Nakamura, M., et al., "Noval Electrochemical Micro–Machining and Its Application for Semiconductor Acceleration Sensor IC," *Digest of Technical Papers*, (1987) Institute of Electrical Engineers of Japan, pp. 112–115.

Petersen, K. E. et al., "Micromechanical Accelerometer Integrated with MOS Detection Circuitry," IEEE, vol. ED–29, No. 1 (Jan. 1982), pp. 23–27.

(List continued on next page.)

*Primary Examiner*—Hezron E. Williams
*Assistant Examiner*—Richard A. Moller
*Attorney, Agent, or Firm*—Weingarten, Schurgin, Gagnebin & Hayes LLP

[57] ABSTRACT

An electrostatically actuated micromechanical sensor having a guard band electrode for reducing the effect of transients associated with a dielectric substrate of the sensor. A proof mass, responsive to an input, is suspended over the substrate and one or more electrodes are disposed on the substrate in electrostatic communication with the proof mass to sense the input acceleration and/or to torque the proof mass back to a null position. A guard band electrode is disposed over the dielectric substrate in overlapping relationship with the electrodes and maintains the surface of the substrate at a reference potential, thereby shielding the proof mass from transients and enhancing the accuracy of the sensor.

6 Claims, 6 Drawing Sheets

U.S. PATENT DOCUMENTS

| | | | |
|---|---|---|---|
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,108,553 | 8/1978 | Zampiello et al. | 356/106 LR |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,222,270 | 9/1980 | Allen | 73/504 |
| 4,234,666 | 11/1980 | Gursky | 428/573 |
| 4,290,052 | 9/1981 | Eichelberger et al. | 361/280 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,347,478 | 8/1982 | Heerens et al. | 324/688 |
| 4,381,672 | 5/1983 | O'Conner et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeil | 73/765 |
| 4,447,753 | 8/1984 | Ochiai | 310/312 |
| 4,452,092 | 6/1984 | Dankwort | 74/5.46 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/280 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 7/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,815,472 | 3/1989 | Wise et al. | 128/675 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,881,410 | 11/1989 | Wise et al. | 73/724 |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,928,203 | 5/1990 | Swindal et al. | 361/280 |
| 4,929,860 | 5/1990 | Hulsing, II et al. | 310/366 |
| 4,945,773 | 8/1990 | Sickafus | 73/862.59 |
| 4,948,757 | 8/1990 | Jain et al. | 437/240 |
| 4,981,359 | 1/1991 | Tazartes et al. | 356/350 |
| 5,001,383 | 3/1991 | Kawashima | 310/367 |
| 5,008,774 | 4/1991 | Bullis et al. | 73/514.32 |
| 5,013,396 | 5/1991 | Wise et al. | 156/628 |
| 5,015,906 | 5/1991 | Cho et al. | 310/309 |
| 5,016,072 | 5/1991 | Greiff | 357/26 |
| 5,025,346 | 6/1991 | Tang | 361/283 |
| 5,054,320 | 10/1991 | Yvon | 73/514.18 |
| 5,055,838 | 10/1991 | Wise et al. | 340/870 |
| 5,060,039 | 10/1991 | Weinberg et al. | 357/26 |
| 5,090,809 | 2/1992 | Ferrar | 356/350 |
| 5,092,174 | 3/1992 | Reidemeister et al. | |
| 5,094,537 | 3/1992 | Karpinski, Jr. | 356/350 |
| 5,101,669 | 4/1992 | Holm-Kennedy et al. | 73/862.64 |
| 5,126,812 | 6/1992 | Greiff | 357/25 |
| 5,130,276 | 7/1992 | Adams et al. | 437/225 |
| 5,138,883 | 8/1992 | Paquet et al. | 73/504 |
| 5,177,661 | 1/1993 | Zavracky et al. | 361/283 |
| 5,194,402 | 3/1993 | Ehrfeld et al. | 437/180 |
| 5,195,371 | 3/1993 | Greiff | 73/505 |
| 5,203,208 | 4/1993 | Bernstein | 73/505 |
| 5,205,171 | 4/1993 | O'Brien et al. | 73/517 B |
| 5,216,490 | 6/1993 | Greiff et al. | 73/517 R |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |
| 5,377,545 | 1/1995 | Norling et al. | 73/517 B |
| 5,383,364 | 1/1995 | Takahashi et al. | 73/514.32 |
| 5,412,327 | 5/1995 | Meinen | 361/280 |
| 5,441,300 | 8/1995 | Yokota et al. | 361/283.3 |

OTHER PUBLICATIONS

Petersen, Kurt E., et al., "Silicon as a Mechanical Material," *Proceedings of the IEEE*, vol. 70, No. 5, May 1982, pp. 420–457.

"Quartz Rate Sensor Replaces Gyros," *Defense Electronics*, Nov. 1984, pp. 177.

Rosen, Jerome, "Machining In the Micro Domain," *Mechanical Engineering*, Mar. 1989, pp. 40–46.

Teknekron Sensor Development Corporation, article entitled "Micro-Vibratory Rate Sensor," 1080 Marsh Road, Menlo Park, CA 94025, 2 pages, undated.

Bryzek, Janusz et al., "Micromachines on the March," IEEE Spectrum, May 1994, pp. 20–31.

IEEE Robotics & Automation Soc. in coop. w/ASME Dynamic Systems & Control Div., "Micro Electro Mechanical Systems, An Investigation of Micro Structures, Sensors Actuators, Machines and Systems," IEEE Cat. #93CH3265-6, Library of Congress #92-56273, Ft. Lauderdale, FL, Feb. 7, -Oct. 1993.

MICROMECHANICAL SENSOR WITH A GUARD BAND ELECTRODE

FIELD OF THE INVENTION

This invention relates generally to micromechanical sensors responsive to electrostatic forces and more particularly, to guard band electrodes for use with such sensors.

BACKGROUND OF THE INVENTION

Micromechanical sensors, such as accelerometers for sensing acceleration and gyroscopes for sensing rotational rate, often include a proof mass suspended over a support substrate by one or more posts and flexures. The proof mass is responsive to an input, such as inertial acceleration or rotational rate, for deflecting out of a predetermined plane as a result of the Coriolis or acceleration forces induced by the input. One or more sense electrodes sense the out-of-plane deflection of the proof mass for further processing to provide a sensor output signal indicative of the input. One type of sense electrode employs capacitive sensing.

The support substrate over which the proof mass is suspended typically comprises a dielectric, such as silicon or glass. U.S. Pat. No. 5,205,171 to O'Brien et al. describes a micromechanical device in which a proof mass is disposed between, and anodically bonded to, a pair of glass layers.

SUMMARY OF THE INVENTION

In accordance with the invention, a micromechanical sensor is provided with a simplified and highly effective technique for reducing the effect of spurious charging and transients associated with the dielectric substrate. The sensor is electrostatically actuated and includes a dielectric substrate susceptible to spurious charging in response to electrostatic forces. A guard band electrode is disposed over substantially an entire surface of the dielectric substrate and maintains the substrate at a reference potential so as to shield the sensor output from transients caused by the spurious charging.

With this arrangement, sensor limitations associated with spurious charging of the dielectric substrate are eliminated by the guard band electrode. Spurious charging has been found to occur on dielectric substrates of devices which are responsive to electrostatic forces. The spurious charging causes transients which may disadvantageously affect the accuracy of the sensor output. One way to avoid inaccuracies caused by the transients is to accommodate the settling time of the transients, thereby resulting in a significantly lowered operating bandwidth. Other techniques are described in the O'Brien et al. Patent and include providing main electrodes that are much larger than the proof mass, a V-groove in the proof mass to increase the distance between the glass and the proof mass, and guard band electrodes extending over the proof mass only at four fingers to contact the proof mass when the device is started up under acceleration. However, the techniques described by O'Brien et al. increase the manufacturing complexity and thus, likely increase device cost and may be of limited effectiveness in reducing the effect of transients.

The guard band electrode scheme of the present invention maintains the surface of the dielectric substrate at a constant reference potential, such as ground. Such control of the dielectric substrate is achieved by covering, with the guard band electrode, any exposed surface area of the substrate surface susceptible to charging. In this way, the sensor proof mass is shielded from transients resulting from electrostatic effects of the charged glass surface.

In one embodiment, the micromechanical sensor includes a dielectric substrate, a proof mass suspended over a surface of the dielectric substrate and responsive to an input, a sense electrode disposed over the surface of the dielectric substrate in electrostatic communication with the proof mass for providing an excitation signal, and a rebalance electrode disposed over the dielectric substrate in electrostatic communication with the proof mass for applying a force to the proof mass to restore the proof mass to a reference plane. A guard band electrode is disposed over the surface of the dielectric substrate in overlapping relationship with a portion of the sense and rebalance electrodes. The guard band electrode receives a reference potential and maintains the surface of the dielectric substrate at the reference potential.

More particularly, the micromechanical sensor includes an insulating layer disposed over a portion of the sense and rebalance electrodes, with the guard band electrode disposed over the insulating layer so as to overlap the electrodes in an electrically isolated manner. The sensor device is processed to remove exposed portions of the insulating layer confronting the suspended proof mass. In this way, any charging of the insulating layer itself is reduced.

Use of the insulating layer to permit the guard band electrode to overlap the sense and rebalance electrodes enables the potential of the entire portion of the dielectric substrate surface adjacent to the proof mass to be controlled by the guard band electrode. Preferably, the guard band electrode extends beyond the proof mass, to the periphery of the substrate, so as to minimize any charging due to fringing fields, thereby enhancing the efficacy of the guard band electrode in reducing the effect of spurious charge.

Also described is a method for fabricating a micromechanical sensor in accordance with the invention in which a processed silicon substrate is bonded to a processed glass substrate. The silicon substrate is doped, such as with boron, to define the proof mass. The glass substrate is etched to form recesses in a surface of the substrate in which the sense and rebalance electrodes are deposited. Thereafter, the insulating layer is deposited over the surface of the substrate in overlapping relationship with the sense and rebalance electrodes. The guard band electrode is deposited over the insulating layer and the device is plasma etched so as to remove any exposed portions of the insulating layer. Thereafter, the doped silicon substrate is bonded to the glass substrate and the undoped portion of the silicon substrate is removed to leave the proof mass suspended over the glass substrate.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
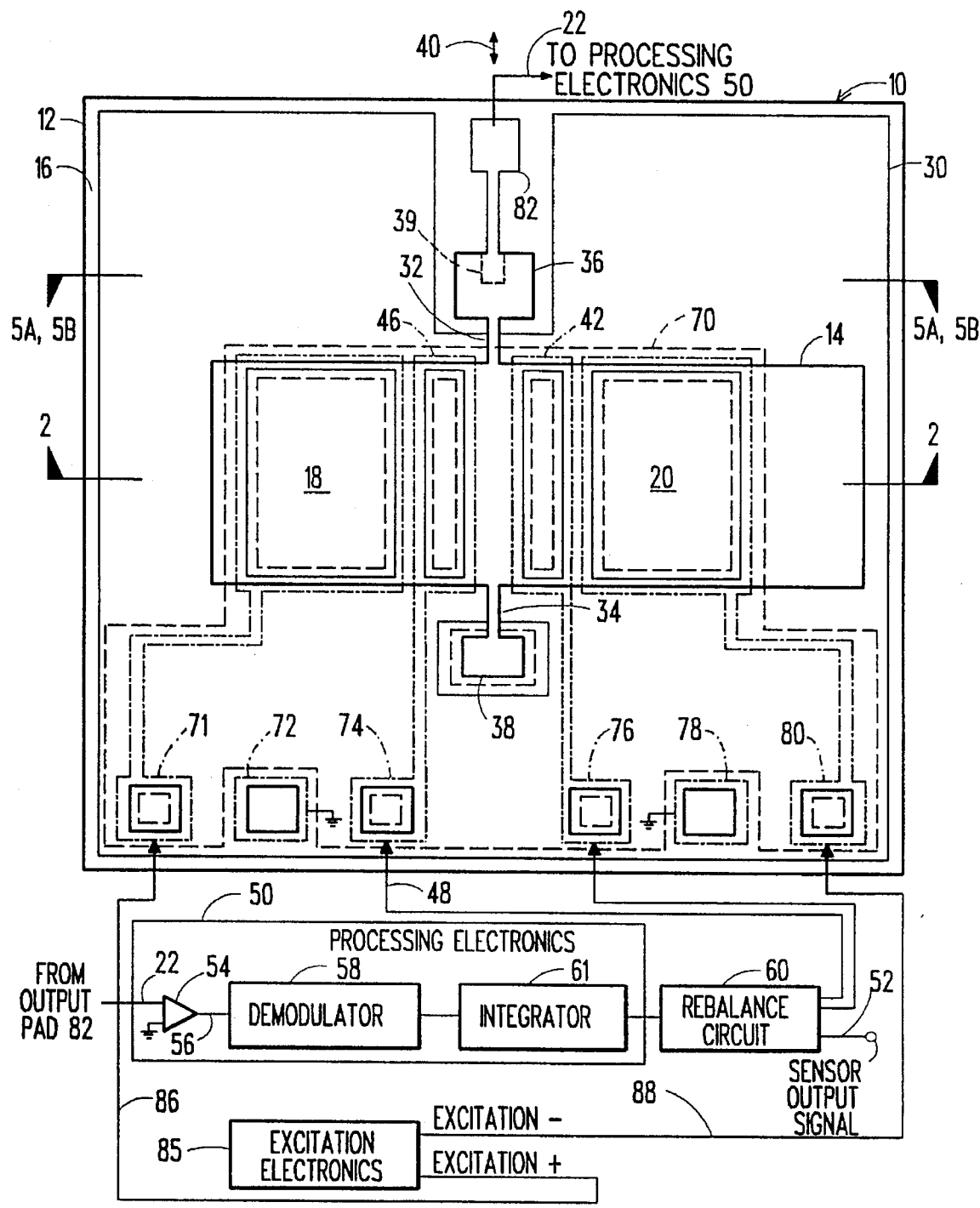
FIG. 1 is a plan view of a micromechanical sensor device in accordance with the invention.

Referring to FIG. 1, a micromechanical sensor device 10 is shown to include a dielectric substrate 12 and a proof mass 14 suspended over a portion of a surface 16 of the dielectric substrate 12. The proof mass 14 is responsive to an input, such as acceleration, and deflects out of an initial null, or reference plane (labelled 44 in FIG. 2) about an axis 40, referred to hereinafter as the output axis 40. Sense electrodes 18, 20, the outlines of which are shown by dot-dashed lines, are disposed over the surface 16 of the dielectric substrate 12 and under the proof mass 14. The sense electrodes 18, 20 are in electrostatic communication with the proof mass, 14 and receive out-of-phase excitation signals 86, 88 from excitation electronics 85. The proof mass 14 forms a common capacitor plate with respect to the sense electrodes 18, 20 such that, when the device is subjected to acceleration, the out-of-plane deflection of the proof mass 14 is sensed by processing the signal on the proof mass 14 to provide a sensor output signal 52 related to the acceleration input.

A guard band electrode 30 is also disposed over the surface 16 of the dielectric substrate 12, in overlapping relationship with a portion of the sense electrodes 18, 20. The outlines of the guard band electrode 30 are shown by solid lines in FIG. 1. The guard band electrode 30 receives a reference potential, such as ground, and maintains the surface 16 of the dielectric substrate 12 at the reference potential.

One or more rebalance electrodes 42, 46 are provided over the surface 16 of the substrate 12, the outlines of which are shown by dot-dashed lines. The rebalance electrodes 42, 46 electrostatically actuate the proof mass 14 with a restoring force. More particularly, the rebalance electrodes 42, 46 receive a rebalance signal 48 in response to the out-of-plane deflection of the proof mass 14 and electrostatically couple a force to the proof mass 14 to restore the proof mass to the null, or reference plane 44.

Various types of micromechanical sensor devices may be readily provided in accordance with the present invention. Generally, devices which will benefit from the transient suppression provided by the guard band electrode described herein are sensors which are responsive to electrostatic forces and which include a dielectric substrate susceptible to spurious charging.. More particularly, it has been found that the dielectric substrate of electrostatically actuated devices experiences spurious charging which may cause transients on the surface of the substrate. Such transients, as well as transients caused by other sources such as high energy radiation, can disadvantageously interfere with the accuracy of the sensor. In order to overcome these disadvantages, the guard band electrode of the present invention shields the surface 16 of the substrate 12, and thus also the sense electrodes 18, 20 and the processing electronics from these transients. Exemplary electrostatically actuated micromechanical sensors include gyroscopes for sensing an inertial rate and accelerometers for sensing inertial acceleration, such as the accelerometer shown in FIGS. 1 and 2.

In the illustrative embodiment of FIG. 1 the dielectric substrate 12 is comprised of PYREX™ glass. The proof mass 14 is suspended over a portion of the surface 16 of the dielectric substrate 12 by a pair of posts 36, 38 and a corresponding pair of flexures 32, 34, respectively. More particularly, the posts 36, 38 extend vertically between the dielectric substrate 12 and a corresponding one of the flexures 32, 34, as will be described further in conjunction with FIGS. 5A–B. Suffice it here to say that the flexures 32, 34 are shaped and sized to permit out-of-plane deflection of the proof mass 14 about the output axis 40 in response to acceleration. The input axis of the device is normal to the plane 44.

Conductive bonding pads 71–82 are disposed over the surface 16 of the substrate 12 to facilitate external access by wire bonding to the accelerometer components. More particularly, pads 71, 80 are electrically connected to sense electrodes 18, 20, respectively, by conductive leads, or traces. Pads 72, 78 are likewise electrically connected to the guard band electrode 30, pads 74, 76 are electrically connected to rebalance electrodes 42, 46, respectively, and output pad 82 is electrically connected to the proof mass 14. The conductive bonding pads 71–82 may be comprised of any suitable material, such as gold.

Processing electronics 50 receive the sense signal 22 from the proof mass 14 via output bonding pad 82 and process the sense signal to provide sensor output signal 52 which is proportional to the input to the sensor 10. More particularly, the processing electronics 50 include an amplifier 54, a demodulator 58, and an integrator 61. A rebalance circuit 60 receives the integrator output signal and provides the rebalance signal 48 to rebalance electrodes 42, 46 (via pads 74, 76, respectively) to restore the proof mass 14 to the reference plane 44. The rebalance circuit also develops a signal 52 proportional to the rebalance voltage which is read out to provide the sensor output signal.

Figure 2:
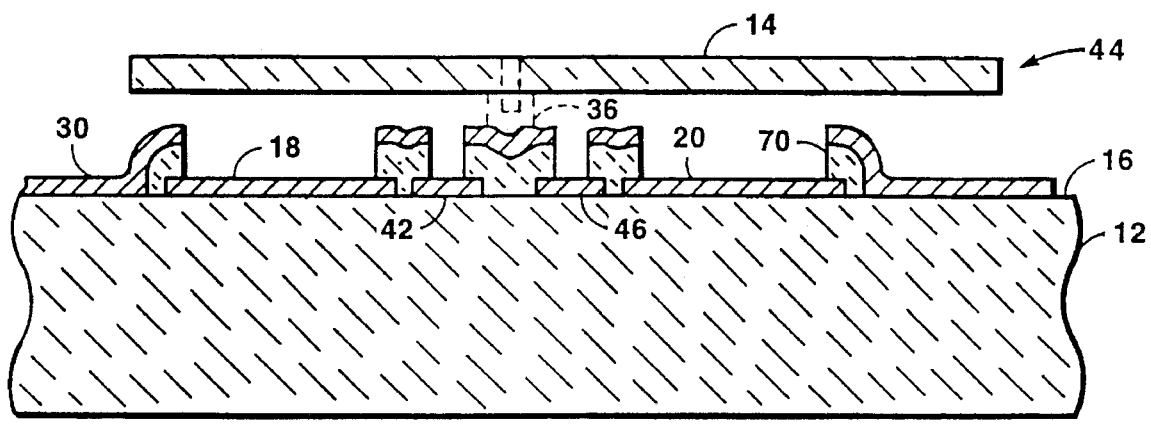
FIG. 2 is a cross-sectional view of the micromechanical sensor device of FIG. 1 taken along line 2—2 of FIG. 1.

The relative positions of the sense electrodes 18, 20, the rebalance electrodes 42, 46, and the guard band electrode 30 on the surface 16 of the substrate 12 will become more apparent by referring also to FIG. 2, which shows a cross-sectional view of a portion of the micromechanical accelerometer 10 of FIG. 1. The guard band electrode 30 is disposed over the substrate 12 in overlapping relationship with the sense electrodes 18, 20 and the rebalance electrodes 42, 46, as shown. In order to prevent the guard band electrode 30 from contacting the sense and rebalance electrodes, an insulating layer 70, the outlines of which are shown by a dashed line in FIG. 1, is provided to electrically isolate the guard band electrode 30 from the sense and rebalance electrodes 18, 20, 42, 46, respectively, as well as from the conductive traces and bonding pads. The insulating layer 70 may be comprised of any suitable insulator, such as glass, and may be deposited by any suitable technique, such as chemical vapor deposition (CVD), to a thickness on the order of 5000 Å.

The insulating layer 70 overlaps the sense and rebalance electrodes so that when the guard band electrode 30 is disposed over the insulating layer 70, the guard band electrode 30 likewise overlaps the sense and rebalance electrodes. With this arrangement, the entire surface area of the glass substrate 12 in the vicinity of the proof mass 14 is covered and controllable by the guard band electrode 30. Another way of stating this is that the proof mass is electrostatically shielded from any surface charges that may occur within the perimeter of the guard band electrode 30. It is noted that the insulating layer 70 may be continuous over the desired areas as shown or, alternatively, may be individual insulating layer portions disposed over these areas.

Preferably, the guard band electrode 30 is disposed over the insulating layer 70 such that the insulating layer 70 is not exposed to the adjacent proof mass 14. Stated differently, it is preferable that any exposed portions of the insulating layer 70 which confront the proof mass 14 be removed. This is because such exposed portions of the insulating layer 70 may be susceptible to spurious charging. To this end, the device is plasma etched to remove any such exposed portions of the insulating layer 70 to provide the device of FIG. 2. Note that for purposes of clarity, the plan view of FIG. 1 shows the device prior to plasma etching as is apparent from the exposed portions of the insulating layer 70 shown in FIG. 1, whereas the cross-section of FIG. 2 shows the device after plasma etching. One suitable reactive ion etching system utilizes CHF3 or CF4 for dry etching the CVD glass of the insulating layer 70. With this arrangement, any transients resulting from the insulating layer 70 being charged are shielded.

As shown in FIGS. 1 and 2, the guard band electrode 30 extends over a substantial portion of the surface area of the substrate surface 16. More particularly, the guard band electrode 30 extends over a larger area of the substrate 12 than the proof mass 14 and preferably, extends to the periphery of the substrate 12. This arrangement is advantageous because transients caused by spurious charge resulting from fringing fields are reduced.

The proof mass 14 is suspended over the glass substrate 12 by the posts 36, 38 (of which only post 36 is shown in phantom in the view of FIG. 2). The posts 36, 38 and the way in which the proof mass 14 is suspended over the glass substrate 12 will be further discussed in conjunction with FIGS. 5A–B.

Figure 3A:
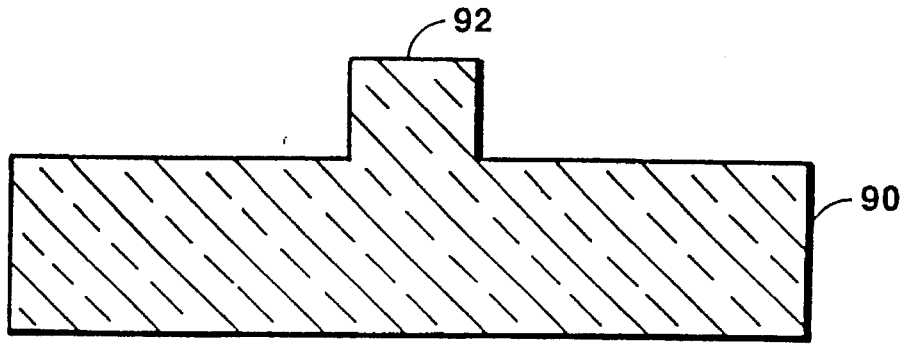
FIGS. 3A–3C are cross-sectional views of the silicon substrate portion of the micromechanical sensor device of FIGS. 1 and 2 during fabrication.
Figure 3B:
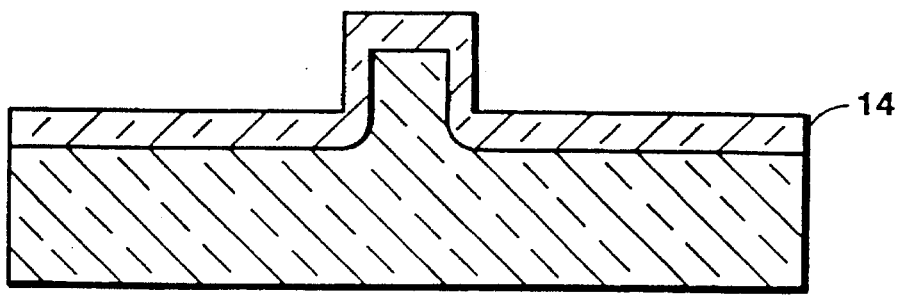
Figure 3C:
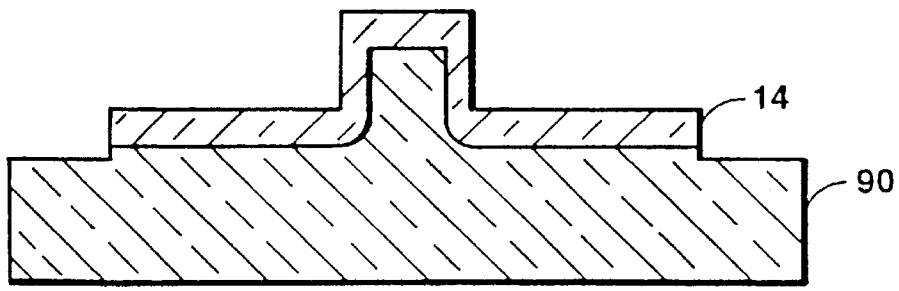

An illustrative technique for fabricating the accelerometer of FIGS. 1 and 2 will now be described. FIGS. 3A–C show various stages of the processing of a silicon substrate 90 to provide the proof mass 14. The undoped silicon substrate 90 has a thickness of approximately 500 microns. The silicon substrate 90 is etched with a conventional photolithographic process to provide a central mesa 92. The mesa 92 will provide a post, such as exemplary post 36, of the accelerometer of FIGS. 1 and 2, as will become apparent.

In FIG. 3B, the silicon substrate 90 is doped with boron using a diffusion process. More particularly, the silicon is doped with boron to a thickness of approximately 5 microns. The boron doping defines the proof mass 14 and thus, the thickness of the boron doping will vary in accordance with the design particulars of the micromechanical sensor.

Thereafter, a reactive ion etching (RIE) step is performed to further define the proof mass 14, as shown in FIG. 3C. More particularly, this RIE step effectively cuts the boron doped proof mass layer 14 according to the desired dimensions of the resulting proof mass.

Figure 4A:
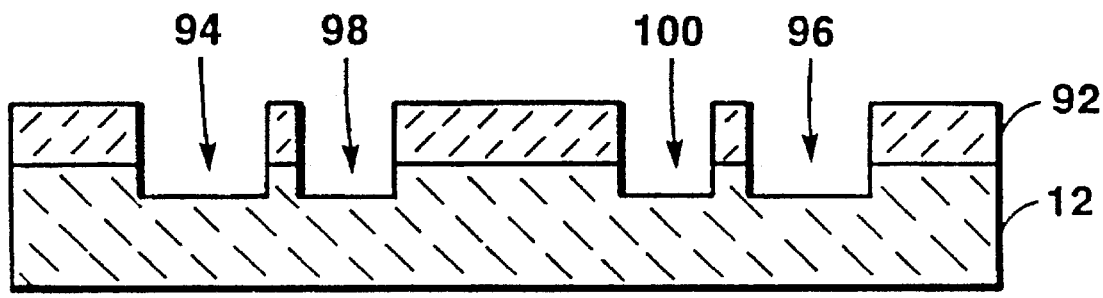
FIGS. 4A–4D are cross-sectional views of the dielectric substrate portion of the micromechanical sensor device of FIGS. 1 and 2 during fabrication.

Referring to FIGS. 4A–D, the glass substrate 12 is shown at various processing stages. The glass substrate 12 has a thickness of approximately 750 microns. In FIG. 4A, a layer of resist 92 is disposed over the glass substrate 12 and patterned in accordance with the desired locations of the surface electrodes, including the sense electrodes 18, 20 and the rebalance electrodes 42, 46. Thereafter, the glass substrate 12 is etched to provide recesses 94–100 in the substrate, as shown.

Figure 4B:
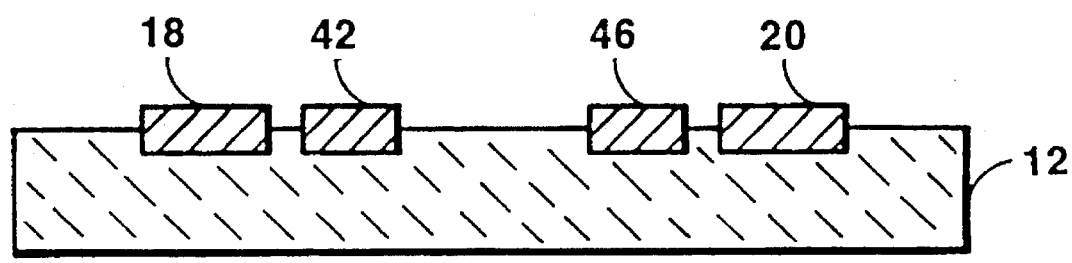

The electrodes comprising a first layer of metal are deposited in the recesses 94–100, as shown in FIG. 4B. The bonding pads 71–82 also comprise first layer metal. The sense electrodes 18, 20 are deposited in recesses 94, 96, respectively, and the rebalance electrodes 42, 46 are deposited in recesses 98, 100, respectively. The electrodes may be comprised of any suitable conductive material, such as a multilayer deposition of titanium tungsten, palladium, and gold, and may be deposited by any suitable technique, such as sputtering to a thickness of approximately 1500 Å. Thereafter, the resist layer 92 is lifted off to provide the structure shown in FIG. 4B. The net protrusion of the metal over the surface of the glass is about 500 Å.

Figure 4C:
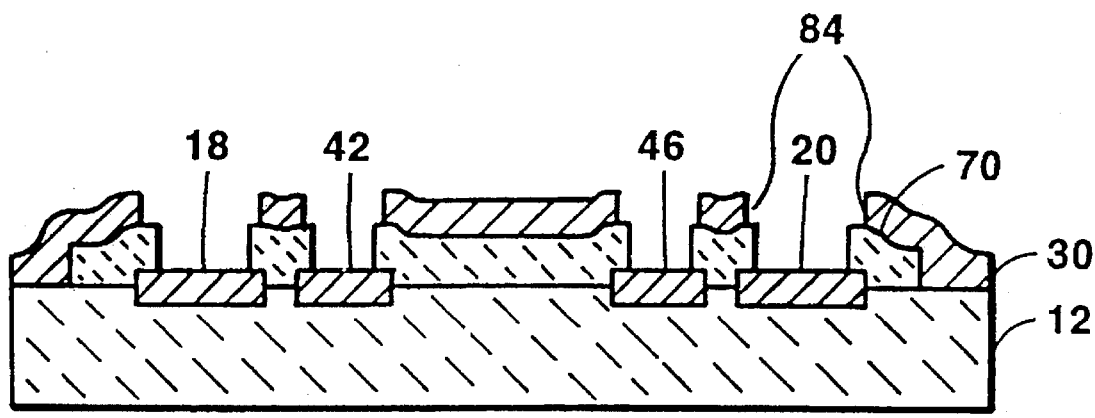

Referring now to FIG. 4C, the insulating layer 70 is deposited, such as by chemical vapor deposition, over the surface 16 of the glass substrate 12. Layer 70 is then patterned by photolithography so that the insulating layer 70 overlaps the sense electrodes 18, 20 and the rebalance electrodes 42, 46 slightly so as to expose central portions of the electrodes. If the guard band electrode 30 is to overlap the entire substrate surface 16, then similar overlaps of the insulating layer 70 are provided over the metal runs and the bonding pads 71–82 (FIG. 1). The only areas which cannot be covered are the surface areas directly under the posts 36, 38 which must be exposed PYREX™ glass so that the silicon posts may be anodically bonded to the substrate in these areas. In one region 39, a metal run is placed in the area to be anodically bonded so that an ohmic contact may be made to the proof mass via the post.

Thereafter, the guard band electrode 30 is deposited over the surface and patterned by photolithography to achieve the overlap of the first level metal of the electrodes as shown. As is apparent from the view of FIG. 4C, portions 84 of the glass insulating layer 70 in confronting relationship with the adjacent proof mass 14 are exposed. Since these exposed portions 84 may be susceptible to spurious charging, it is advantageous to remove such portions 84. To this end, the device is plasma etched, as described above. The resulting structure is shown in FIG. 4D.

Figure 4D:
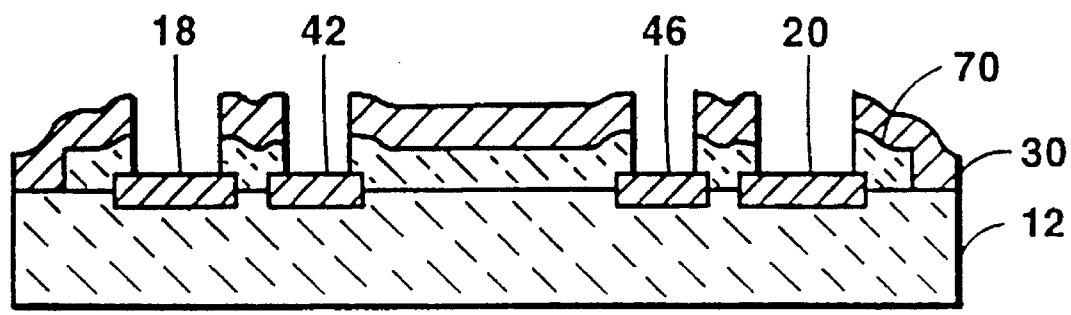
Figure 5A:
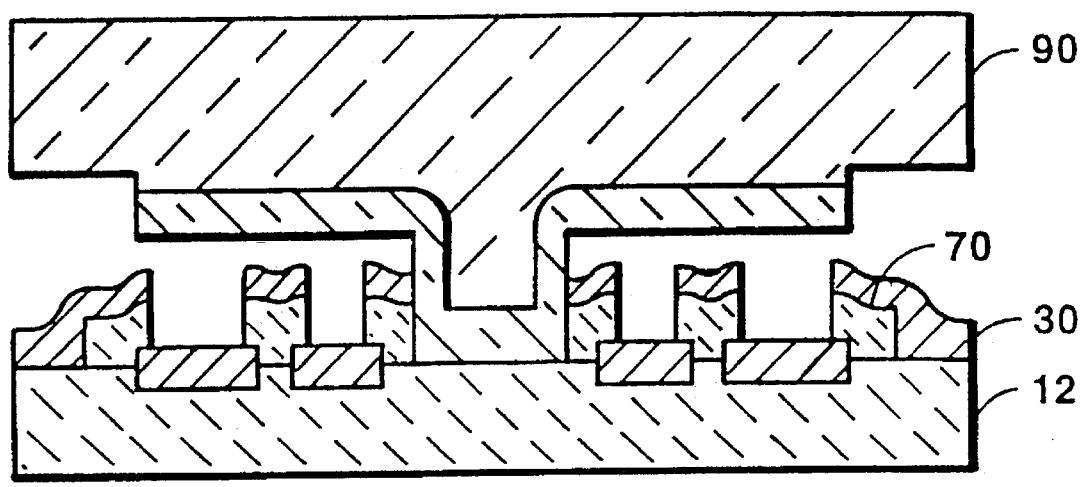
FIGS. 5A–5B are cross-sectional views of the micromechanical sensor device of FIGS. 1 and 2 during fabrication taken along line 5A, 5B—5A, 5B of FIG. 1.
Figure 5B:
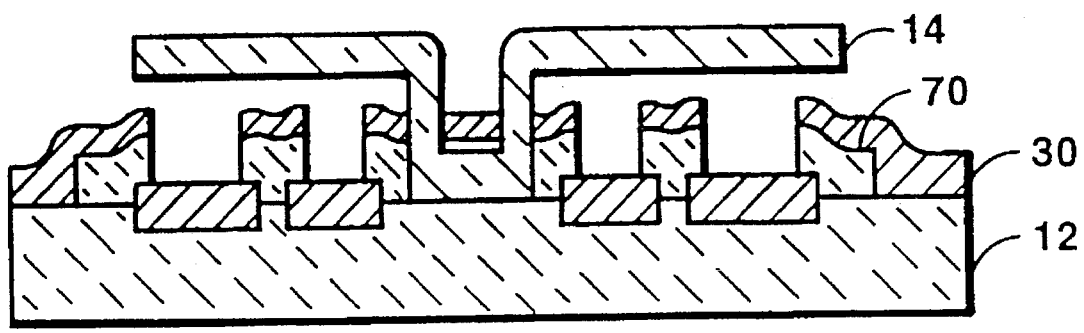

Referring now to FIGS. 5A–B, the silicon structure of FIG. 3C is inverted and bonded to the glass substrate structure of FIG. 4D. More particularly, the mesa of the silicon structure is anodically bonded to a central region of the glass substrate 12, as shown. With this arrangement, the accelerometer of FIGS. 1 and 2 is provided. The mesa provides a post to support the proof mass 14 over the substrate.

In FIG. 5B, the silicon substrate 90 is etched, such as with an EDP etchant, to remove the undoped portion of the substrate, as shown. The boron doped proof mass 14 remains and is suspended over the substrate 12.

In a particularly severe environment, such as ionizing radiation, it may be necessary to have the guard band electrode 30 overlap the output trace and output bonding pad 82 as well as the sense and rebalance electrodes 18, 20 and 42, 46, respectively. This may be readily done in the same manner as described above in conjunction with the guard band electrode 30 overlapping the sense and rebalance electrodes. Since this arrangement would introduce additional node capacitance and reduce the sensor signal to noise ratio, its desirability for reducing the effect of transients must be weighed against a potentially reduced signal to noise ratio. In general, the voltage swing on the output lead is too small to induce a significant transient.

Having shown the preferred embodiment, those skilled in the art will realize many variations are possible which will still be within the scope and spirit of the claimed invention. Therefore, it is the intention to limit the invention only as indicated by the scope of the claims.

I claim:

1. A micromechanical sensor device comprising:

a dielectric substrate having a surface;

a proof mass suspended over said surface of said dielectric substrate and having a surface oriented in a reference plane, said proof mass being responsive to an input and forming a first capacitor plate;

a first electrode disposed over said surface of said dielectric substrate for coupling an excitation signal to said proof mass and forming a second capacitor plate;

a second electrode for sensing out-of-plane deflection of said proof mass;

an insulating layer disposed over said surface of said dielectric substrate in overlapping relationship with a portion of said first electrode and said second electrode; and a guard band electrode disposed over said insulating layer so as to overlap said portion of said first electrode and said portion of said second electrode, said guard band electrode receiving a reference potential for shielding said proof mass from spurious charge on said surface of the dielectric substrate.

2. The micromechanical sensor device recited in claim 1 further comprising a rebalance electrode disposed over said surface of said dielectric substrate and in electrostatic communication with said proof mass for applying a force to said proof mass in response to a rebalance voltage applied to said rebalance electrode, said force causing said proof mass to return to said reference plane.

3. The micromechanical sensor device recited in claim 2 wherein said insulating layer is disposed over said surface of said dielectric substrate in overlapping relationship with a portion of said rebalance electrode, wherein said guard band electrode is disposed over said insulating layer so as to overlap said portion of said rebalance electrode.

4. The micromechanical sensor device recited in claim 2 further comprising a signal processor responsive to a sense signal from said second electrode for providing a sensor output signal proportional to said input and for providing said rebalance voltage.

5. The micromechanical sensor device recited in claim 1 further comprising a pair of posts and a pair of flexures coupled between said dielectric substrate and said proof mass for suspending said proof mass over said surface of said dielectric substrate.

6. The micromechanical sensor device recited in claim 1 wherein said guard band electrode extends over said surface of said dielectric substrate beyond said proof mass.

\* \* \* \* \*

UNITED STATES PATENT AND TRADEMARK OFFICE
CERTIFICATE OF CORRECTION

PATENT NO. : 5,581,035
DATED : December 3, 1996
INVENTOR(S) : Paul Greiff

It is certified that error appears in the above-identified patent and that said Letters Patent is hereby corrected as shown below:

```
Column 4, line 22, "proof mass L4" should read
--proof mass 14--.
```

Signed and Sealed this

Twenty-third Day of November, 1999

Attest:

Q. TODD DICKINSON

*Attesting Officer*  *Acting Commissioner of Patents and Trademarks*